United States Patent [19]
Gelbart

[11] Patent Number: 5,802,034
[45] Date of Patent: Sep. 1, 1998

[54] MULTI-TRACK OPTICAL READ/WRITE HEAD

[76] Inventor: Daniel Gelbart, 4688 Pine, Crescent, Vancouver, British Columbia, Canada, V6J 4L2

[21] Appl. No.: 762,638

[22] Filed: Dec. 9, 1996

[51] Int. Cl.[6] .................................................. G11B 7/00
[52] U.S. Cl. ........................ 369/102; 369/97; 369/112
[58] Field of Search .............................. 369/102, 97, 93, 369/112, 109, 14, 44.37, 275.4, 59

[56] References Cited

U.S. PATENT DOCUMENTS

| | | | |
|---|---|---|---|
| 4,577,932 | 3/1986 | Gelbart | 350/358 |
| 5,081,617 | 1/1992 | Gelbart | 369/112 |
| 5,128,693 | 7/1992 | Tatemichi et al. | 346/108 |
| 5,198,920 | 3/1993 | Gobeli et al. | 359/245 |
| 5,237,556 | 8/1993 | Pierce | 369/97 |
| 5,311,360 | 5/1994 | Bloom et al. | 359/572 |
| 5,321,683 | 6/1994 | Olezak | 369/112 |
| 5,339,305 | 8/1994 | Curtis et al. | 369/112 |
| 5,561,654 | 10/1996 | Hamilton et al. | 369/97 |

OTHER PUBLICATIONS

Optical Tape Recorder Brochure (from 1991), no month available.

Optical Tape Recorder Service Manual (from 1992) (section about topics and autofocus) no month available.

*Primary Examiner*—Tan Dinh

[57] ABSTRACT

A multi-track optical read/write head uses a light valve to split the beam from a single laser diode to a large number of channels, recorded on an optical disc or tape. Readout is achieved by line illumination and a linear array of detectors. The number of channels in the light valve exceeds the number of recorded tracks and a single light valve channel is smaller than the optical resolution of the system. The division into a large number of channels allows to modulate the width of the written mark in order to achieve increased data recording density.

6 Claims, 2 Drawing Sheets

5,802,034

MULTI-TRACK OPTICAL READ/WRITE HEAD

FIELD OF INVENTION

The invention relates to optical data storage, and in particular to multi-track disc and tape system, both of the erasable and non-erasable type.

BACKGROUND ON THE INVENTION

Multi-track recording and readout is well known in the art of optical data storage. A commercial product, the Creo Optical Tape Recorder, sold by Creo Products (Burnaby, BC, Canada) from 1991 to 1996 incorporates these features as well as electronic tracking of the data. It is an object of this invention to achieve a much higher number of parallel tracks recorded simultaneously as well as higher recording density. Another object is to generate all tracks from a single laser diode, thus enhancing reliability. Prior art recording of multiple tracks used scanning, a plurality of laser sources, or an Acousto-Optic modulator with pulsed light. These methods have inherent trade-offs when the number of channels becomes large.

SUMMARY OF THE INVENTION

The invention forms a large number of recorded tracks from a single laser diode by using the laser diode to illuminate a multi-channel light valve and imaging the light valve onto an optical recording media. When the number of light valve channels exceeds the number of recorded tracks, further increase in the recording density is possible by modulating the width, as well as length, of each recorded mark.

DETAILED DESCRIPTION OF THE PREFERRED EMBODIMENT

Figure 3:
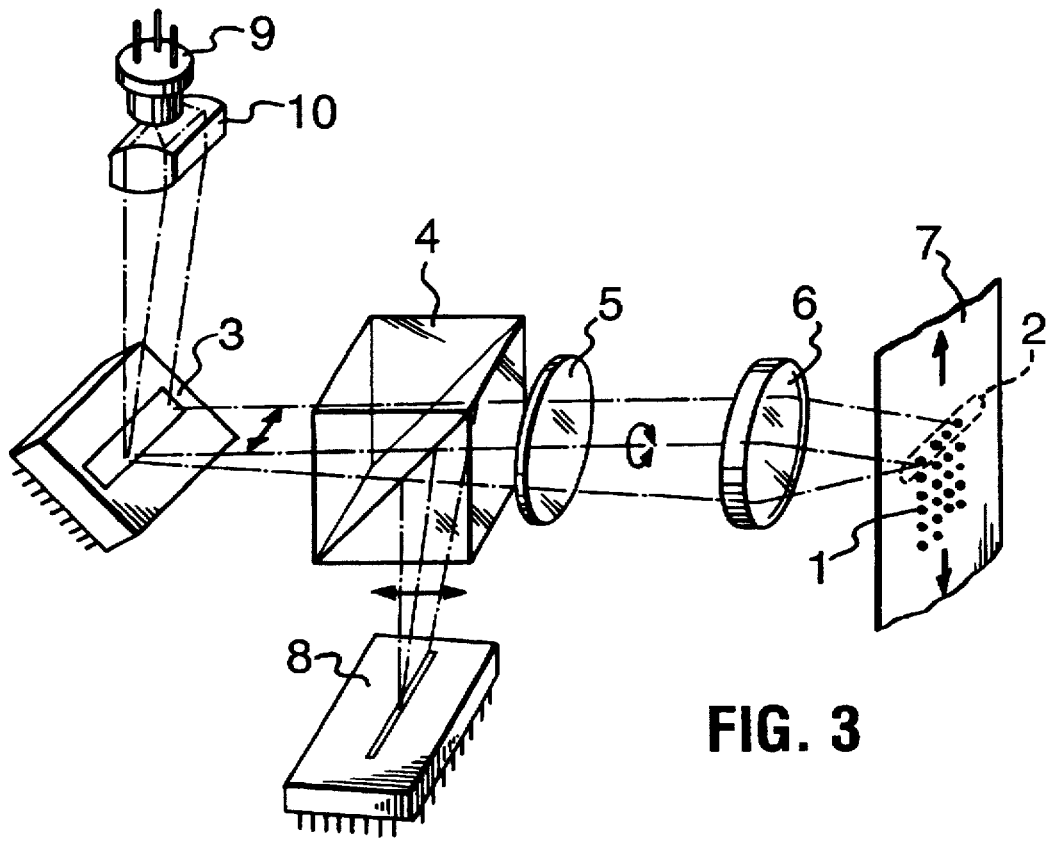
FIG. 3 is a schematic representation of the present invention.

Referring now to FIG. 3, a laser diode 9 generates a line on the surface of light valve 3 using a lens 10. Laser diode 9 can be of the single mode type, and in this case lens 10 is a combination of a spherical and cylindrical lens. Laser diode 9 can also be of the "stripe" type, and in this case lens 10 can be a single spheric or aspheric lens imaging the laser diode stripe onto light valve 3. The advantage of using a "stripe" type diode is that a higher power diode can be used and the intensity of the imaged line is more uniform along the light valve, as the energy distribution is flat instead of Gaussian. The line formed on light valve 3 is imaged, at a high reduction ratio, onto optical media 7 using lens 6. Lens 6 is typically an aspheric lens of high numerical aperture and an autofocus mechanism (not shown) is used to overcome the shallow depth of focus of such a lens. Between light valve 3 and lens 6 a polarizing beam splitter 4 and quarter-wave plate 5 is used in order to divert the light reflected from optical media 7 onto detected array 8. In order to read recorded data, laser diode 9 is turned on at a reduced intensity, or a separate read diode is used. Light valve 3 has all channels enabled, in order to image a line of light 2 across tracks 1 on optical media 7. The linearly polarized light of diode 9 becomes circularly polarized by waveplate 5. The light reflected from media 7 passes through waveplate 5 again and become linearly polarized in an orthogonal direction. Polarizing beam splitter 4 reflects this orthogonal direction of polarization onto detector array 8. Both light valve 3 and detector array 8 are at conjugate image planes to the data tracks 1. Additional lenses can be used in the optical path to match the image size to the detector size. All the elements shown in FIG. 3, with the exception of the use of the light valve, are well known in the optical data storage industry and no further details are given. For details of the multi-track readout method see U.S. Pat. No. 5,081,617 hereby incorporated in full. These methods are well known and incorporated in a commercial product, the Model 1012 Optical Tape Recorder by Creo Products (B.C., Canada).

Figure 1:
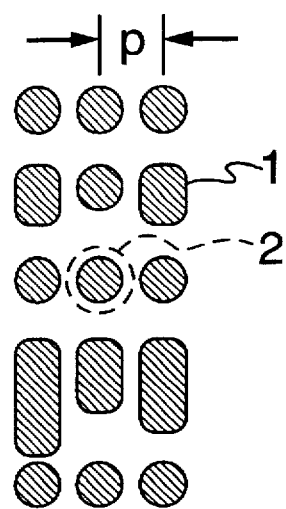
FIG. 1 shows the recording format of prior art multi-track optical recording using a multi-channel read but not using mark length or mark width modulation.
Figure 2:
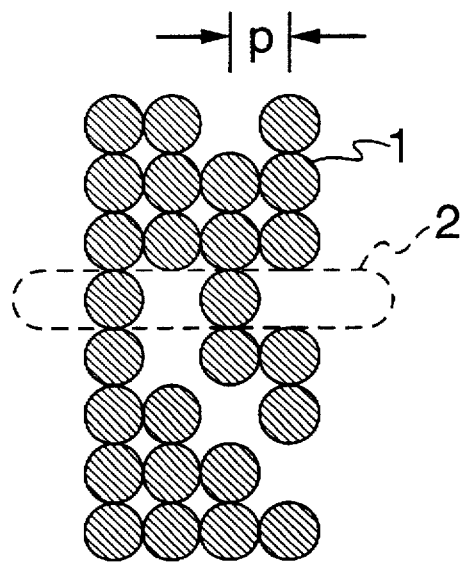
FIG. 2 shows the recording format of prior art mark length encoding.
Figures 4, 5:
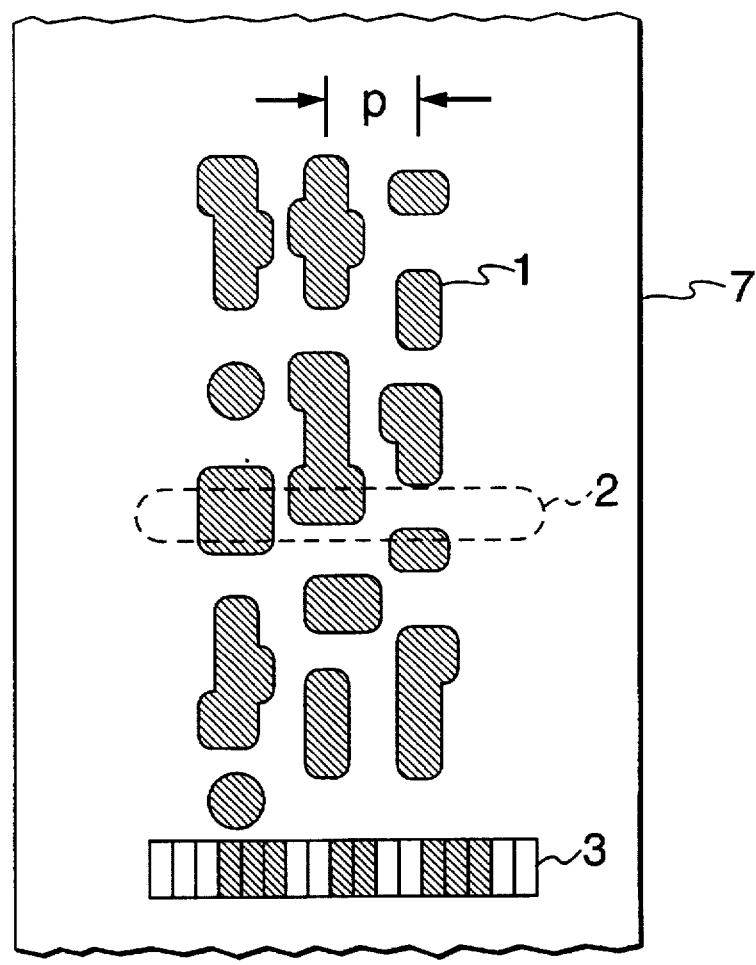
FIG. 4 shows the recording format according to the present invention.
FIG. 5 shows an example of mark width coding according to the present invention.

The use of a light valve (also known as a spatial light modulator, or SLM) for the simultaneous recording of multiple data tracks has numerous advantages over the prior. The use of a single laser diode to record a large number of tracks in parallel increases reliability. The recorded data rates can be very high, as the relative motion between the optical media and the writing beam need not be fast if a sufficiently large number of tracks is recorded in parallel. Another advantage is the ability to increase recording density by using not only mark length modulation, as shown by the prior art of FIG. 1, but by modulating the mark width, as shown in FIG. 4 and FIG. 5. Referring now to FIG. 3 and FIG. 4, light valve 3 contains a plurality of channels for each track of recording. Referring to FIG. 4, the image of light valve 3 is shown as line of light 2 on optical recording media 7. The pitch of data tracks 1 is shown as "p". The light valve 3 has multiple channels, typically four, per pitch "p". Each one of these channels, when imaged in isolation, is smaller than the resolving power of the objective lens 6 in FIG. 3. If a plurality of adjacent channels are turned on, the area will be sufficiently large to be fully resolved and recorded. In FIG. 4 the smallest mark, a round dot, corresponds to the resolving power of the optical system. To record data in which the mark length (in the scan direction) is varied but the mark width remains constant, the channels of the light valve are divided into identical groups, for example every two light valve channels are grouped together. If there is no need for mark width encoding, the number of channels of the light valve 3 can be equal to the number of the data tracks 1, and the size of each light valve channel can be chosen to form a clear mark on the optical media. The recording format thus generated can be any one of the format currently used in optical disc or optical tape systems. In order to achieve increased data density by modulating the width of the mark, the number of light valve channels has to be larger than the number of data tracks 1. In FIG. 4, by the way of example, the light valve 3 has four channels per data track and the minimum number of channels required to form a clearly resolvable spot on the media is two. When two out of four light valve channels are turned on, a mark of a minimal width is formed. This mark can be made wider to one side by turning on an extra light valve channel, adjacent to the two already on. The mark can be widened on the other side by turning on another light valve channel on the other side of the original channels. The five possibilities of changing the mark width are shown in FIG. 5. To represent the binary combination "00" no channels are on. "01" is represented by a minimal mark width, formed when two channels are turned on. "10" is formed when three light valve channels are turned on, using the original two plus the adjacent channel from the right. "11" is formed when three channels are turned on, using the original two plus the adjacent channel form the left. If four channels are turned on an even wider mark is formed. It is clear from the encoding of FIG. 5 that over two bits of information can be carried by one mark width. A similar scheme is applied to the mark length in the conventional way shown in FIG. 1. Combining both mark length and width modulation the number of bits per mark can be 3, 4, or even 5. Coding rules (known as "run length limitations") similar to those that apply to the mark length encoding also apply to the mark width, although the encoding methods for the length and width can differ. Only the simplest mark width encoding scheme was chosen as an example shown by FIGS. 4 and 5. It is clear to those versed in the art that more complex width coding schemes can be used, in particular when more channels are assigned to a data track. Even in the simple example of FIG. 5 an alternate coding scheme is possible, in which the "no mark" state is not used and the minimum mark width represents "00" while the maximum width represents "11". It is also clear that the field-of-view of detector array 8 exceeds the width of data tracks if electronic tracking of the data (per U.S. Pat. No. 5,081,617) is required. If no tracking and no width modulation is required the number of data tracks can be equal to the number of detector channels. The number of detector greatly exceeds the number of tracks both for tracking and for accurate determination of mark width. Any type of light valve fast enough for the data rate used can be employed. The preferred light valves for this invention are electro-optical, for example the light valve disclosed in U.S. Pat. No. 5,198,920, or micro-machined silicon light valves such as those manufactured by Texas Instruments (Dallas, Tex.) or Silicon Light Machines (Sunnyvale, Calif.). A detailed description of this light valve is given in the U.S. Pat. No. 5,311,360.

Referring now to FIG. 3, by the way of example, the components in the preferred embodiment are:

A. Laser diode 9: Spectra Diode Laboratories (SDL) model SDL-7431-HI, 500 mw 670 nm red laser diode. This diode is of the "stripe" type.

B. Collecting lens 10: Molded aspheric glass lens, part number 350022, $f=4.5$ mm, N.A.=0.47, made by Geltech (Orlando, Fla.).

C. Light valve 3: Silicon micromachined 512 channel light valve from Silicon Light Machines (Sunnyvale, Calif.). The light valve has 4 silicon ribbons per channel. Every 4 channels form a single track pitch, thus 128 data tracks are recorded simultaneously. The aperture of lens 6 is used to separate the diffraction orders generated by this type of light valve, allowing only the zero order to pass.

D. Beam Splitter 4 & 5: Optical Isolator for 670 nm with waveplate (zero order quarter waveplate) available from Lambda Research (Cerritos, Calif.). A second lens, not shown in FIG. 3, is added next to light valve 3 to act as a field lens for final lens 6.

E. Final lens 6: identical to collimating lens 10.

F. Read array 8: C-MOS detector array with 1024 channels (512 for reading the data, rest for tracking) channel pitch is identical to pitch of light valve channels. Read array details including calibration are similar to the one used on the Creo Optical Tape Recorder model 1012. Supplier of read array is Orbit Semiconductors (Mountain View, Calif.).

The distance between light valve 3 and lens 6 is chosen in order to achieve track spacing of 1.2 microns. The distance from detector array 8 to lens 6 is identical to light valve 3 to lens 6 distance. Smallest recorded mark size is about 0.8 microns. Total width of the recorded group of tracks is $128 \times 1.2 + 0.8 = 154.4$ microns. For example, a light value using a 3 µm silicon ribbon pitch and four channels per track, four ribbons per channel has a pitch of $4 \times 4 \times 3 = 48$ micron per track. To reduce this by a factor of 40, to 1.2 µm pitch, using $f=4.5$ mm lens, the distance from the light valve to lens 6 is 184.5 mm. The same distance is used from lens 10 to light valve. A cylindrical field lens of $f=100$ mm is used at light valve, to allow the zero order beam to be captured by the aperture of lens 6. The laser diode stripe of 0.25 mm is magnified 40 times to 10 mm on the light valve, which is $48 \times 128 = 6144$ µm=6.14 mm wide.

While the system is suitable for any type of optical media, the preferred embodiment uses phase change optical tape available from Kodak (Rochester, N.Y.) and Polaroid (Cambridge, Mass.) and phase change optical discs.

What is claimed is:

1. An optical recording head for recording at least one data track, comprising:

a) a multi-channel light valves;

b) a light source illuminating said multi-channel light valve;

c) a recording medium sensitive to imaging radiation so as to form permanent image marks in response to incidence of the imaging radiation; and, d) an imaging assembly located intermediate said light valve and said recording medium operative to focus radiation from said light valve onto said recording medium so as to record permanent image marks thereon;

wherein said light valve has a plurality of channels for said data track in order to change the width of said track by varying the number of light valve channels forming said track, the varying of the number of light valve channels being used to increase storage density of data recorded on said recording medium.

2. An optical recording head as defined in claim 1, wherein said light valve is made of micromachined silicon.

3. An optical recording head as defined in claim 1, wherein said light valve is made of an electo-optical material.

4. An optical recording head as defined in claim 1, wherein said light source is a laser diode.

5. A method of recording optical data utilizing a modulating light valve having a plurality of valve elements each element corresponding to a channel with a plurality of such channels assigned to each data track on a recording medium, comprising: varying the width of each mark in the data track by varying the number of channels activated in order to encode a plurality of data bits in each one of said marks.

6. An optical recording head for simultaneously recording a plurality of data tracks, comprising:

(a) a multi-channel light valve;

(b) a laser diode illuminating said multi-channel light valve;

(c) a imaging assembly intermediate said laser diode and said light valve operative to image light from said laser diode as a line on said light valve;

(d) a recording medium sensitive to laser imaging radiation so as to form permanent image marks in response to incidence of the laser imaging radiation; and (e) an imaging assembly located intermediate said light valve and said recording medium operative to focus radiation from said light valve onto said recording medium so as to record permanent marks thereon;

wherein said light valve has a plurality of channels for each of said plurality of data tracks in order to change the width of said tracks by varying the number of light valve channels forming each of said tracks, the varying of the number of light valve channels being used to increase storage density of data optically recorded on said recording medium.

* * * * *